(12) United States Patent
Shatalin et al.

(10) Patent No.: US 8,595,640 B2
(45) Date of Patent: Nov. 26, 2013

(54) RENDER TRANSFORM BASED SCROLLING AND PANNING FOR SMOOTH EFFECTS

(75) Inventors: Mikhail Shatalin, Bellevue, WA (US); Gunjan A. Shah, Redmond, WA (US); Shawn T. Oster, Seattle, WA (US); Jonathan D. Sheller, Seattle, WA (US); Ashraf A. Michail, Redmond, WA (US); Akhilesh Kaza, Redmond, WA (US); Alan C. T. Liu, Redmond, CA (US)

(73) Assignee: Microsoft Corporation, Redmond, WA (US)

( * ) Notice: Subject to any disclaimer, the term of this patent is extended or adjusted under 35 U.S.C. 154(b) by 337 days.

(21) Appl. No.: 12/958,418

(22) Filed: Dec. 2, 2010

(65) Prior Publication Data

US 2012/0144333 A1 Jun. 7, 2012

(51) Int. Cl.
*G06F 3/14* (2006.01)

(52) U.S. Cl.
USPC ........... 715/771; 715/719; 715/760; 715/800; 345/156

(58) Field of Classification Search
USPC .......... 715/200–277, 700–867; 700/701–866; 709/201–229; 345/30–111
See application file for complete search history.

(56) References Cited

U.S. PATENT DOCUMENTS

| | | | |
|---|---|---|---|
| 5,006,837 A | 4/1991 | Bowers | |
| 6,834,965 B2 | 12/2004 | Raskar et al. | |
| 6,856,326 B1 | 2/2005 | Zhai | |
| 7,222,306 B2 * | 5/2007 | Kaasila et al. | 715/801 |
| 7,671,334 B2 | 3/2010 | Lapstun et al. | |
| 2003/0095135 A1 * | 5/2003 | Kaasila et al. | 345/613 |
| 2004/0075641 A1 * | 4/2004 | Widdowson | 345/156 |
| 2008/0252595 A1 * | 10/2008 | Boillot | 345/156 |
| 2009/0235187 A1 * | 9/2009 | Kim et al. | 715/760 |
| 2010/0146436 A1 * | 6/2010 | Jakobson et al. | 715/800 |
| 2011/0060992 A1 * | 3/2011 | Jevons et al. | 715/719 |
| 2011/0167382 A1 * | 7/2011 | van Os | 715/800 |

OTHER PUBLICATIONS

"Optimizing WPF Application Performance", Retrieved at << http://msdn.microsoft.com/en-us/library/aa970683%28VS.85%29.aspx >>, Retrieved Date: Aug. 11, 2010, pp. 10.

Schouten, Bas., "Direct2D: Hardware Rendering a Browser", Retrieved at << http://www.basschouten.com/blog1.php/2009/11/22/direct2d-hardware-rendering-a-browser >>, Nov. 22, 2009, pp. 54.

(Continued)

*Primary Examiner* — Ruay Ho
(74) *Attorney, Agent, or Firm* — Chin IP, PLLC; Davin Chin

(57) ABSTRACT

An information display system is described herein that separates rendering of information from receiving that information so that the rendering portion can be quickly displayed to the user and the data can arrive as it is available to provide further detail. The rendering portion creates a hardware surface measured to fill the area to be consumed by the list box or other control. Independently, the information retrieval portion queries information from a server or other source and processes the information as it is received. The system can then perform a transformation on the previously created hardware surface to insert the information in the rendered control without re-laying out the entire control or recreating user interface elements. Moving a surface is a cheaper operation for a CPU and can easily be accelerated using a GPU.

20 Claims, 4 Drawing Sheets

(56) References Cited

OTHER PUBLICATIONS

"Smooth Scrolling With Large Images?—Flash Kit Community Forums", Retrieved at << http://board.flashkit.com/board/showthread.php?t=799536 >>, Jul. 25, 2009, pp. 3.

"Smooth Scrolling a La IPhone?", Retrieved at << http://forum.xda-developers.com/archive/index.php/t-679037.html >>, May 10, 2010, pp. 4.

"IPhone TableView With a Lot of Images", Retrieved at << http://stackoverflow.com/questions/1247554/iphone-tableview-with-a-lot-of-images >>, Aug. 8, 2009, pp. 2.

"Re: Browser Scrolling Performance—Msg#00021", Retrieved at << http://osdir.com/ml/android-platform/2009-02/msg00021.html >>, Retrieved Date: Aug. 11, 2010, pp. 2.

* cited by examiner

RENDER TRANSFORM BASED SCROLLING AND PANNING FOR SMOOTH EFFECTS

BACKGROUND

List boxes and similar user interface controls are a common way to display information on computer systems. As the amount of information users consume has increased, these controls may hold potentially thousands of items. Over time, list boxes have received various improvements to handle the quantity of information for which they are used. For example, some implementations store only a small amount of visible information in the control and notify applications when more information is needed (e.g., as a user scrolls through the information). Other implementations cache items so that they are more readily available.

Mobile devices introduce a number of constraints that are not present or are less problematic on desktop computers. Mobile devices typically include a less powerful central processing unit (CPU) and graphics-processing unit (GPU), if one is present at all. In addition, connectivity between mobile devices and sources of information (e.g., information servers) may be limited. For example, some areas may offer EDGE or 3G connections while others offer higher bandwidth Wi-Fi connections.

The slow speed of retrieving and processing information can cause a number of undesirable behaviors on a mobile device, including stuttering that is visually disconcerting for the user. Lists of information often include information that is not suitable for caching. For example, lists of email messages, social networking updates, and similar information may be fast changing such that cached information would quickly become out of date. On the other hand, the quantity of information and delay to retrieve it makes waiting for all of the information to arrive before displaying anything to the user an unacceptable wait for the user. When information is available, processing it often involves re-layout of the whole control in modern implementations. CPU utilization dramatically increases during this operation, which leads to the stuttering. Users expect mobile user interfaces to remain responsive under a variety of challenging conditions.

SUMMARY

An information display system is described herein that separates rendering of information from receiving that information so that the rendering portion can be quickly displayed to the user and the data can arrive as it is available to provide further detail. In some embodiments, the system includes a rendering thread and an information retrieval thread. The rendering thread creates a hardware surface measured to fill the area to be consumed by the list box or other control. Independently, the information retrieval thread queries information from a server or other source and processes the information as it is received. The system can then perform a transformation on the previously created hardware surface to insert the information in the rendered control without re-laying out the entire control or recreating user interface elements. Moving a surface is a cheaper operation for a CPU and can easily be accelerated using a GPU. Thus, the information display system provides a more satisfying user experience that is less resource intensive on mobile devices and less likely to stutter.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

An information display system is described herein that separates rendering of information from receiving that information so that the rendering portion can be quickly displayed to the user and the data can arrive as it is available to provide further detail. In some embodiments, the system includes a rendering thread and an information retrieval thread. The rendering thread creates a hardware surface measured to fill the area to be consumed by the list box or other control. For example, the rendering thread may create one or more rectangular areas for displaying items of information (e.g., one per email message), even before the items of information have been received from the information source. If the rendering thread knows or can predict that there will be 100 items, for example, the rendering thread can go ahead and create a surface for displaying 100 items even before those items are available.

Independently, the information retrieval thread queries information from a server or other source and processes the information as it is received. The system can then perform a transformation on the previously created hardware surface to insert the information in the rendered control without re-laying out the entire control or recreating user interface elements. Users may see detail of items "pop" into view but the layout of the control itself and the ability to scroll the control are unaffected regardless of the state of arrival of the information items. In some embodiments, the hardware surface encompasses a small area relative to the entire size of the list needed for display of the list. For example, the surface may encompass the viewable area plus an area equal to the size of the viewable area above and below the viewable area. This allows the system enough time to prepare items for display by moving them (e.g., through translation) onto the viewable surface as the user scrolls. Moving a surface is a cheaper operation for a CPU and can easily be accelerated using a GPU. Thus, the information display system provides a more satisfying user experience that is less resource intensive on mobile devices and less likely to stutter.

Figure 1:
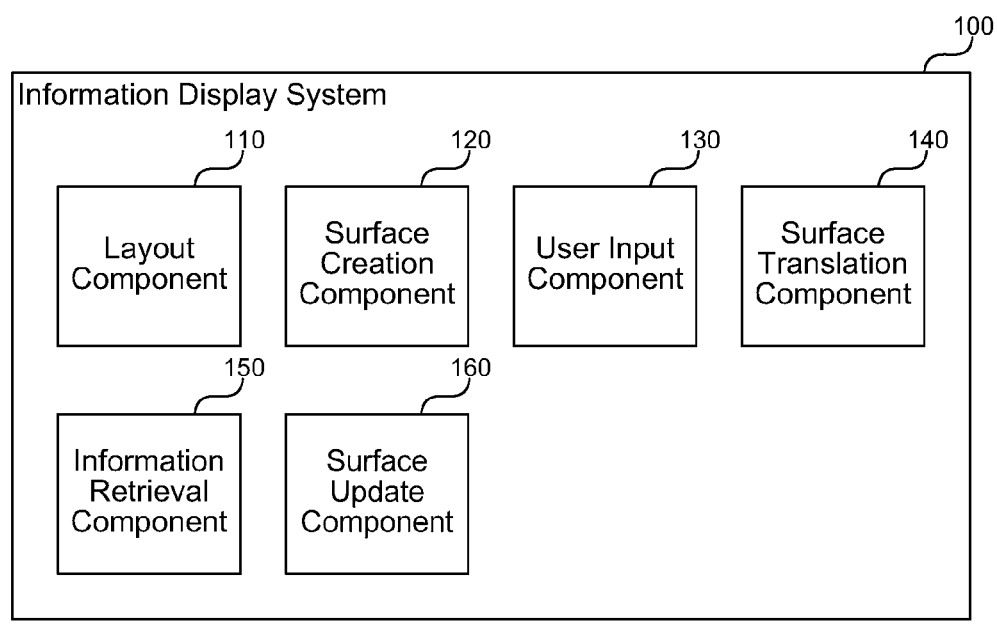
FIG. 1 is a block diagram that illustrates components of the information display system, in one embodiment.

FIG. 1 is a block diagram that illustrates components of the information display system, in one embodiment. The system 100 includes a layout component 110, a surface creation component 120, a user input component 130, a surface translation component 140, an information retrieval component 150, and a surface update component 160. Each of these components is described in further detail herein.

The layout component 110 determines a layout for a user interface control and creates one or more user interface elements that populate the control. For example, the layout component 110 may identify a visible area of a device, such as a mobile phone, identify an area consumed by a particular type of data (e.g., a list of email messages), and determine a layout of the control that will allow display of at least part of the data within the visible area of the device. For devices with small screens, the layout component 110 may determine a layout area that is larger than the screen size, such that a user can view part of the area at any one time and scroll the display to view other parts of the area. For example, the control may contain hundreds or thousands of items while the display may show just a few items at a time.

The surface creation component 120 creates a graphical surface that represents an area associated with the user interface control. The graphical surface may be manageable by hardware, such as a GPU, so that operations related to the surface (e.g., transformations, translation, and so on) can be accelerated by hardware for faster responsiveness. The surface creation component 120 creates the surface one time for the duration of the control. Unlike prior systems that destroy and create user interface elements as they go out of and come into view, the information display system 100 manages one viewable area and swaps information onto and off the previously created graphical surface. This reduces resource consumption and improves the experience displayed to the user.

The user input component 130 receives user input that modifies the user interface control. For example, the user input may include a finger swipe on a touch screen, a pressing of a key, or other input that scrolls the control, selects an item, or performs some other operation that causes the control to change. In response, the system may modify the appearance of the control, such as by highlighting a selected item, panning the display to scroll additional items into view, zoom or shrink the control to display more or fewer items, and so forth. The user input component 130 communicates the user's actions to other components of the system 100 that update the control's appearance.

The surface translation component 140 modifies the created graphical surface in response to received user input. For example, the surface translation component may move the surface to center a visible area of the user interface control on a difference location of the surface. For example, if the user swipes left, the surface translation component 140 may move the graphical surface conceptually to the left, which moves the viewable area to the right on the surface so that the user can see items displayed there. The surface translation component 140 can perform movements that are horizontal, vertical, or some combination thereof. The surface translation component 140 allows a surface created at the instantiation of the control to be used throughout the control's lifetime to display a variety of different information. Because creation and destruction of user interface elements consumes resources and involves substantial display updates visible to the user, the reuse of elements saves resources and reduces flickering and stutter that are potentially visible to the user.

The information retrieval component 150 retrieves one or more information items for display in the user interface control from one or more information sources in parallel with displaying the control. The information sources may be remote from the device displaying the information items, and the information retrieval component 150 may access a network to retrieve the items from the information sources. Computing devices are often connected to one or more networks, such as cellular networks, local area networks, Wi-Fi networks, Bluetooth networks, and so forth. Depending on the device's location and connection type, the retrieval of information can take a variable amount of time. The information retrieval component 150 retrieves information items independently of the display of the user interface control. This allows the system 100 to render the control based on the speed of the device's hardware rather than based on the speed at which information items arrive from the network. Available items can be displayed quickly while items that take longer to retrieve can be displayed as they arrive.

The surface update component 160 updates the created graphical surface to display information items arriving in response to retrieving the items from the information sources. When an information item arrives, the system 100 determines where in the user interface control the item belongs, and if the item is currently visible or is within an area that the graphical surface prepares for visibility, then the surface update component 160 loads the information item into a previously created user interface element for displaying the item. For example, if the item is an email message, the control may already be displaying a box that represents the email message and an icon indicating it is an email message. After the message is retrieved, the surface update component 160 updates the item to include preview text of the subject and/or body of the message. The separation of initial control rendering from arrival of information items provides a quick and responsive user interface to the user that does not vary as network conditions change.

The computing device on which the information display system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
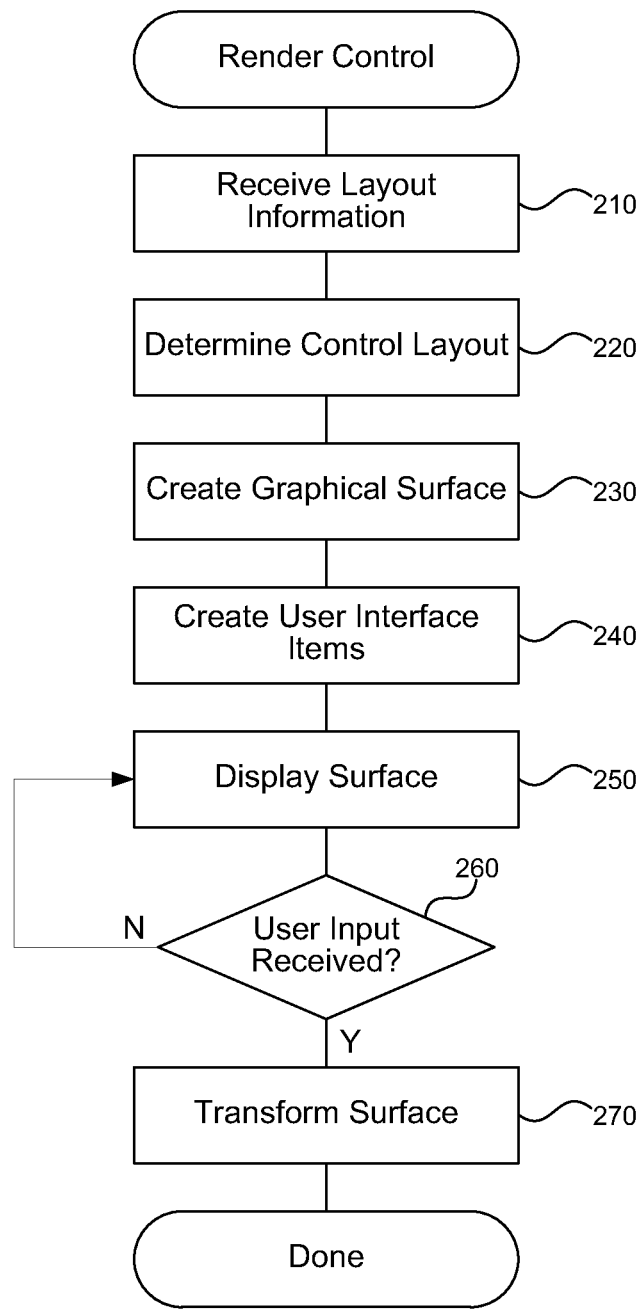
FIG. 2 is a flow diagram that illustrates processing of the information display system to render a user interface control, in one embodiment.

FIG. 2 is a flow diagram that illustrates processing of the information display system to render a user interface control, in one embodiment. Beginning in block 210, the system receives layout information for displaying a control on a computing device. For example, the system may receive information about the size of information to be displayed, a visible area determined by a device screen size or portion of a window in which to display the control, and other information that affects the layout of the control.

Continuing in block 220, the system determines a layout based on the received layout information. The determined layout may include information about screen coordinates in which to display the control, a size of the control (e.g., width and height), a visible area of the control, a precaching area of the control, and so on. The control may prepare a larger area that what is actually displayed for precaching. Precaching allows the control to prepare areas of the control that may soon come into the visible area based on user scrolling or other actions. By precaching, the control has that area prepared before the area comes into view, so that the precached area can be translated into the visible area (e.g., by panning).

Continuing in block 230, the system creates a graphical surface for displaying the control. The graphical surface may include a type of surface manageable by common graphics hardware, such as a GPU. GPUs are efficient at manipulating certain graphical objects, and by using a graphical surface that is manageable by the GPU, the system can offload work from the CPU for displaying and manipulating the control. Even mobile devices often now include a GPU sufficient for performing basic graphical operations on controls. The graphical surface is a rectangular or other area sized to include the visible area and precached areas of the control. As user interface items become visible, the system moves those items onto the graphical surface for display.

Continuing in block 240, the system creates one or more user interface items associated with the graphical surface that display individual information items. For example, the graphical surface may display a list of social network updates (e.g., Facebook status, Twitter feeds, and so forth), and each user interface item may represent one such update. The system can create a number of user interface items equal to the number that are within the area of the hardware surface and then reuse these items as new information items become visible (e.g., due to user scrolling). Thus, rather than destroying user interface items that fall out of view (or the precaching area), the system can keep these items and bind new information items to the user interface items.

Continuing in block 250, the system displays the created graphical surface and user interface items without waiting for retrieval of the information that the items represent. For example, if the items are email messages, the system separately requests the email messages from a server or other source, but proceeds to display the user interface items with basic information even before the email messages are available. This allows the user interface to display and update in constant or at least predictable time that is independent of varying network conditions.

Continuing in decision block 260, if the system receives user input, then the system continues at block 270, else the system loops to block 250 to continue displaying the surface while waiting for retrieved items. User input can include a variety of indications of user actions, such as a swipe from a touch screen, click of a mouse, press of a key, or input from a stylus or other device. The user input typically requests modifying the control in some way, such as by scrolling the visible area of the control to display new items.

Continuing in block 270, the system transforms the displayed surface in response to the received user input. If items are coming into view that are in the precached area, then the system can simply translate the hardware surface by moving the surface (or the viewport over the surface) a value of coordinates determined by the received input. Because of the translation, new items may fall into the precached area, and the system may begin retrieving those items so that they are ready for display in response to further user input. The system may operate in a loop (not shown) waiting for user input until some exit condition, such as selecting different user interface or exiting an application. After block 270, these steps conclude.

Unlike previous systems, the information display system does not invoke a layout pass as part of rendering in many cases. A majority of user interface updates can be performed using low cost animations that can be offloaded to a GPU or other hardware, freeing more resources for other computational tasks (or saving battery life).

Figure 3:
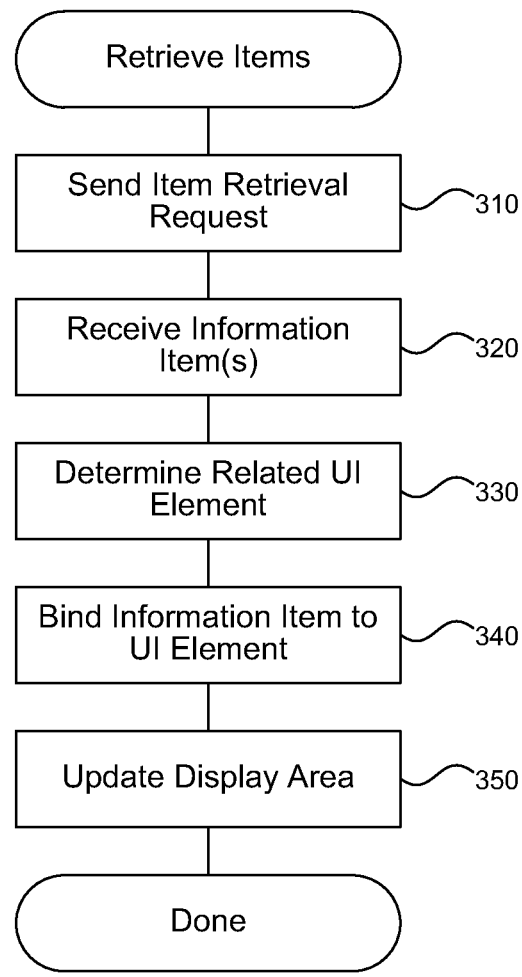
FIG. 3 is a flow diagram that illustrates processing of the information display system to independently retrieve information items for display in a user interface control, in one embodiment.

FIG. 3 is a flow diagram that illustrates processing of the information display system to independently retrieve information items for display in a user interface control, in one embodiment. Beginning in block 310, the system sends one or more information retrieval requests to request one or more information items from one or more information sources. For example, the system may request a list of email messages on behalf of a user from an email server accessible via the Internet. The request may take an amount of time to complete that is noticeable to the user. During that time, the system can go ahead and display the controls through which the user will view the email messages, and allow the user to view messages that have previously been retrieved or new messages as they arrive.

Continuing in block 320, the system receives the information items from the information sources. For example, one or more responses to the requests may arrive. Each information item may include details about the subject of the request, such as sender and recipient information and a message body for an email message or text for a social networking update.

Continuing in block 330, the system determines a user interface element related to each received information item. For example, the system may identify one or more previously created user interface controls that represent each email message in a message list. Many items have a fixed size and the system can determine that size and display a placeholder for information items even before the details of those information items has arrived. This allows the system to layout the control, to smoothly display the control to the user, and to allow item details to populate the control as those details become available.

Continuing in block 340, the system binds at least one received information item to a previously created user interface element. In this way, the system can manage a fixed number of user interface elements that represent a number that fit within the controls visible and precaching area, and reuse the user interface elements for different information items based upon a current state of the control. For example, if there are 100 information items and the control displays 10 at a time and precaches 20 (10 above and below the currently displayed 10), then the system may at any given time be using the 30 user interface elements to bind to the 30 information items that are currently in range of the control's viewable area. As the user moves the control by scrolling or other interactions, the system may bind different information items to some or all of the user interface elements.

Continuing in block 350, the system updates the displayed control with the received information for the bound information item. For example, if a placeholder for the item was previously displayed in the control, the system may update the display to include the item's details that were retrieved. The control is displayed even before the first update is received, and may change multiple times as new information arrives from the information sources. During that span of time, however, the system renders the control smoothly and allows the user to move and manipulate the control. The system may loop (not shown), continuing to receive more information items and to update the display area as the items are available. After block 350, these steps conclude.

Figure 4:
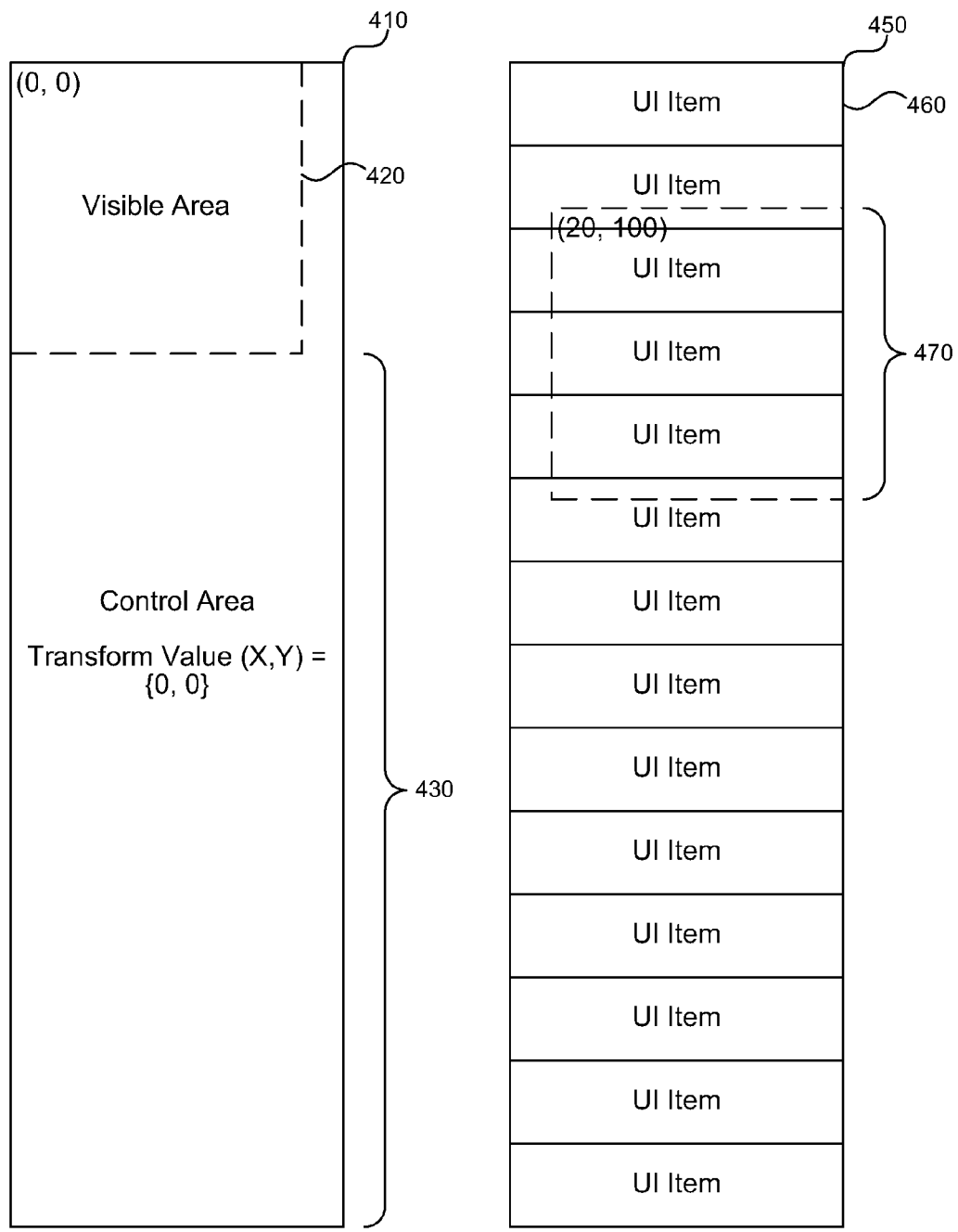
FIG. 4 is a display diagram that illustrates a control displayed using the information display system in two states, in one embodiment.

FIG. 4 is a display diagram that illustrates a control displayed using the information display system in two states, in one embodiment. The display diagram includes a control area 410 displayed in a first state in which a visible area 420 is located at coordinates (0, 0) relative to the control's boundaries. The precache area 430 represents an area of the control in which user interface items are prepared for view in the event that the visible area 420 becomes relocated. The display diagram also shows the control area 450 in a subsequent state in which the user has scrolled the display to cause the visible area 470 to be located at coordinates (20, 100). In response to user input, the system translates a graphical surface displaying the control area 450, such that the visible area is relocated in accordance with the user's request. The control area 450 also illustrates the user interface items 460 that may be displayed within the control area 450. The location of the visible area 470 causes certain user interface items to be visible, while others are waiting to be displayed. Each user interface item represents a different information item that has been retrieved or is being retrieved from an information source. The visible area 470 displays the user interface items regardless of the state of retrieval of the information item, separating rendering from information retrieval. If an information item within the visible area 470 is not yet available, the system may display placeholder or summary information until the item is available. Upon arrival of the information item's details, the system locates and binds an appropriate user interface item to the information item and displays the more detailed retrieved information.

In some embodiments, the information display system displays a control using a fixed memory size. Many devices, such as mobile phones, have limited resources particularly in terms of available memory. A device platform may attempt to provide applications with as much memory as possible and/or as predictable of a memory footprint as possible. By creating and reusing a certain number of user interface items, the information display system can maintain a relatively steady amount of memory usage irrespective of an underlying number of information items that can be displayed. For example, whether a user's inbox contains hundreds or thousands of messages that can be displayed in a list control, the system may be able to display the list control with a steady amount of memory sufficient to display 20 of the items at a time.

In some embodiments, the information display system precaches items an amount below and/or above a current position of the visible area. The precached area is an area that contains items likely to come into view upon a user scrolling or other action. The amount of items precached may be configurable or be automatically determined by the system based on available memory, a target memory footprint, or other considerations. When a user scrolls an amount into the precached area (e.g., halfway), the system may reuse out of view user interface containers for items coming into view. In some embodiments, the system may determine the total amount of items and set a threshold for using container swapping. For example, below 50 items, swapping containers may involve more computational overhead than is justified by its benefit.

In some embodiments, the information display system resizes user interface items after arrival of corresponding information items. Because the system may display user interface items before the underlying details are available, the system may guess or use a default item size that turns out not to suit the content of the information item after it arrives. For example, an information item may contain a thumbnail image that exceeds the initial boundaries of the user interface items. In such cases, the system may resize the user interface item after the information item arrives. The resizing of a user interface item may also affect the overall control sizing, and the system may perform a transform on the graphical surface displaying the control if needed to properly display the larger user interface item.

In some embodiments, the information display system imposes a velocity cap on user input. In a scrolling interface, users may be able to scroll so fast that the control cannot display user interface items fast enough to keep up or cannot retrieve any information items in time to display anything other than blank placeholders. For example, in a touch-based control, users can flick a list box to scroll and the velocity of the flick is often considered to set the speed of scrolling. An application developer and/or user may configure the system to place a cap on the velocity at which the interface can scroll to provide a satisfactory experience.

In some embodiments, the information display system handles actions other than scrolling by first controlling the rendering thread. As described herein, the system may incorporate a rendering thread and information retrieval thread to separate processing of display of a control from retrieving items to populate the control. Users can perform a variety of actions with respect to the control, such as tapping to stop scrolling abruptly. There is normally very little need for coordination between the threads, and when the user performs this type of action, the system can affect the rendering thread quickly so that the user's intention is reflected by the user interface (e.g., scrolling stops quickly), and can more slowly determine any action needed related to information retrieval (e.g., cancel retrieval of items).

From the foregoing, it will be appreciated that specific embodiments of the information display system have been described herein for purposes of illustration, but that various modifications may be made without deviating from the spirit and scope of the invention. For example, although mobile devices have been described, the system may be applied to other resource-limited hardware platforms, such as digital media appliances, embedded computing platforms, kiosks, and so forth. Accordingly, the invention is not limited except as by the appended claims.

We claim:

1. A computing device-implemented method for displaying a user interface on the computing device, the method comprising:

receiving layout information for a user interface to be at least partially displayed by the computing device, wherein the user interface includes a visible area and a precached area, wherein the user interface is associated with each of a plurality of user interface items, and wherein the plurality of user interface items includes at least one user interface item that has yet to be received by the computing device;

rendering, based at least in part on the received layout information, the user interface before receipt of the at least one user interface item that has yet to be received by the computing device;

displaying, by the computing device, a first portion of the rendered user interface, the first portion being within an area of the user interface defined by a surface;

receiving a request to display a second portion of the rendered user interface; and in response to the received request, displaying, by the computing device, the second portion of the rendered user interface, including:

performing a move transform to the surface.

2. The method of claim 1, wherein the layout information includes descriptions of sizes for portions of the user interface that are to be allocated to each of the plurality of user interface items.

3. The method of claim 1, wherein the layout information comprises information describing a size of a screen of the computing device.

4. The method of claim 1, wherein rendering the user interface comprises determining screen coordinates for the user interface, a size of the user interface, and a size of the first portion and of the second portion.

5. The method of claim 1, wherein rendering the user interface comprises rendering the precached area of the user interface, the precached area being larger than the first portion.

6. The method of claim 1, wherein performing the move transform to the surface includes performing the move transform with a graphics processing unit (GPU) associated with the computing device.

7. The method of claim 1, wherein:
the user interface includes a fixed number of reusable user interface elements, and wherein
the method further comprises:
reusing, in response to a scrolling of user interface items into a visible area, the fixed number of user interface elements to display user interface items of the plurality of user interface items.

8. The method of claim 1, wherein the plurality of user interface items including a greater number of user interface items than are to be simultaneously displayed by the computing device.

9. The method of claim 1, wherein the request represents user input, the user input including a swipe.

10. The method of claim 1, wherein displaying the second portion comprises displaying the second portion without rerendering the user interface.

11. The method of claim 1, wherein performing the move transform to the surface includes moving the surface by an amount based on the request.

12. The method of claim 1, further comprising:
in response to the received request, submitting a retrieval request for retrieval of user interface items that are within the precached area, wherein the precached area is adjacent to the second portion.

13. A computer-readable storage medium having instructions stored therein for performing operations that display a user interface on a computing device, the operations comprising:
receiving layout information for a user interface to be at least partially displayed by the computing device, wherein the user interface includes a visible area and a precache area, wherein the user interface is associated with each of a plurality of user interface items, and wherein the plurality of user interface items includes at least one user interface item that has yet to be received by the computing device;
rendering, based at least in part on the received layout information, the user interface before receipt of the at least one user interface item that has yet to be received by the computing device;
displaying, by the computing device, a first portion of the rendered user interface, the first portion being within an area of the user interface defined by a surface;
receiving a request to display a second portion of the rendered user interface; and
in response to the received request, displaying, by the computing device, the second portion of the rendered user interface, including:
performing a move transform to the surface.

14. The computer-readable storage medium of claim 13, wherein the layout information includes descriptions of sizes for portions of the user interface that are to be allocated to each of the plurality of user interface items.

15. The computer-readable storage medium of claim 13, wherein rendering the user interface comprises rendering the precache area of the user interface, the precache area being larger than the first portion.

16. A computing device for displaying a user interface, the computing device comprising:
a memory configured to store instructions; and
a processor configured to execute the stored instructions, wherein execution of the stored instructions causes the computing device to:
receive layout information for a user interface to be at least partially displayed by the computing device, wherein the user interface includes a visible area and a precache area, wherein the user interface is associated with each of a plurality of user interface items, and wherein the plurality of user interface items includes at least one user interface item that has yet to be received by the computing device;
render, based at least in part on the received layout information, the user interface before receipt of the at least one user interface item that has yet to be received by the computing device;
display a first portion of the rendered user interface, the first portion being within an area of the user interface defined by a surface;
receive a request to display a second portion of the rendered user interface; and
in response to the received request, display the second portion of the rendered user interface, including:
perform a move transform to the surface.

17. The computing device of claim 16, wherein the layout information includes descriptions of sizes for portions of the user interface that are to be allocated to each of the plurality of user interface items.

18. The computing device of claim 16, wherein execution of the stored instructions that cause the computing device to render the user interface also cause the computing device to render the precache area of the user interface, the precache area being larger than the first portion.

19. The computing device of claim 16, wherein:
the user interface includes a fixed number of reusable user interface elements, and wherein
execution of the stored instructions also causes the computing device to:
reuse, in response to a scrolling of user interface items into a visible area, the fixed number of user interface elements to display user interface items of the plurality of user interface items.

20. The computing device of claim 16, execution of the stored instructions also causes the computing device to:
in response to the received request, submit a retrieval request for retrieval of user interface items that are within the precache area, and wherein the precache area is adjacent to the second portion.

* * * * *